United States Patent
Osawa

Patent Number: 5,671,881
Date of Patent: Sep. 30, 1997

[54] METHOD OF MANUFACTURING AN OPTICAL ISOLATOR

[75] Inventor: Ryuji Osawa, Sendri, Japan

[73] Assignee: Tokin Corporation, Miyagi, Japan

[21] Appl. No.: 682,620

[22] PCT Filed: Nov. 27, 1995

[86] PCT No.: PCT/JP95/02404

§ 371 Date: Sep. 3, 1996

§ 102(e) Date: Sep. 3, 1996

[87] PCT Pub. No.: WO96/17270

PCT Pub. Date: Jun. 6, 1996

[30] Foreign Application Priority Data

Nov. 25, 1994 [JP] Japan ................................. 6-315839

[51] Int. Cl.⁶ ........................................................ B23K 1/20
[52] U.S. Cl. ........................ 228/208; 228/122.1; 372/703
[58] Field of Search .............................. 228/208, 122.1, 228/174, 254; 372/6, 703

[56] References Cited

U.S. PATENT DOCUMENTS

| | | | |
|---|---|---|---|
| 5,033,052 | 7/1991 | Masuko et al. | 372/36 |
| 5,113,404 | 5/1992 | Gaebe et al. | 372/36 |
| 5,128,956 | 7/1992 | Aoki et al. | 372/43 |
| 5,329,539 | 7/1994 | Pearson et al. | 372/36 |

FOREIGN PATENT DOCUMENTS

| | | |
|---|---|---|
| 5-53087 | 3/1993 | Japan . |
| 6-34861 | 2/1994 | Japan . |

*Primary Examiner*—Samuel M. Heinrich
*Attorney, Agent, or Firm*—Frishauf, Holtz, Goodman, Langer & Chick

[57] ABSTRACT

A method of mass-producing reliable, optical isolators, which allows reliable soldering and metallization in large quantities. The method comprises forming grooves (2) wider than a cutting margin along predetermined cut lines for cutting out a plurality of optical devices on the surface of an optical material block (1), forming then an antireflection film and a metallized film (3), and cutting the block along the grooves (2) ino optical elements (5).

1 Claim, 4 Drawing Sheets

METHOD OF MANUFACTURING AN OPTICAL ISOLATOR

TECHNICAL FIELD

This invention relates to a method of manufacturing an optical isolator which is for use in optical communication, optical measurement, and the like and which utilizes the Faraday effect and, in particular, to a method of manufacturing an optical isolator which is excellent in environment resistance.

BACKGROUND ART

Recently, an optical Communication system using a semiconductor laser as a light source and an optical apparatus employing a semiconductor laser have become widely used and are more and more expanding in scope and scale of applications.

In order to improve the accuracy and the stability of the optical communication system and the optical apparatus of the type described, an optical isolator is used for the purpose of removing a return light to the semiconductor laser.

The optical isolator comprises optical elements including a polarizer, an analyzer, and a Faraday rotator, a permanent magnet for generating a magnetic field, and a holder for fixing and protecting these components.

An organic adhesive has been used in a conventional method of fixing and adhering each optical element to the holder. However, the organic adhesive is poor in long-term stability of the adhesive strength and deteriorated in characteristic particularly due to the change in environmental condition such as the temperature and the humidity.

In view of the above, for the optical isolator used in, for example, an optical communication repeater, which is required to have a highly reliability over a long time period, it is proposed to manufacture the optical isolator by the use of a metal fusion-bonding method, instead of the conventional fixing method using the organic adhesive.

The adhering and fixing method using the metal fusion-bonding method is a technology brought into practical use and is used in wide applications such as a gas turbine blade, a vacuum window of a magnetron or a microwave electron tube, and a high-output high-frequency propagation transmitter tube. In the optical isolator, a metallized layer for fixation by metal fusion-bond is formed on at least a peripheral region except a light transmitting portion of the optical elements. The holder and each optical element are bonded together by soldering.

Those materials used in forming the metallized layer are different in dependence on materials to be adhered. Generally, in order to assure an adhesion strength, a layer consisting of Cr, Ta, W, Ti, Mo, Ni, or Pt, or a layer consisting of an alloy including at least one of the above-mentioned metals is formed as an underlying layer. Au, Ni, Pt or the like is used as a topmost layer. An intermediate layer of Ni or Pt may be formed between the underlying layer and the topmost layer.

As a fusion bonding metal, use is made of soldering materials such as Au—Sn alloy, Pb—Sn alloy, and Au—Ge alloy or various kinds of brazing materials. Among those, the Au—Sn alloy soldering material having a high adhesive strength and a relatively low fusion temperature is preferred for use in fixation by metal fusion bonding because it is excellent in adhesive strength and working efficiency.

As a method of forming the above-mentioned metallized layer, a wet process by plating and a dry process by vacuum deposition or sputtering are known. Among those, the dry process is often used in order to prevent the defect occurrence and the dust sticking on an optical surface of the optical element or an antireflection film.

However, when a metallized film is formed by the vacuum deposition or the sputtering, there is a serious problem in mass productivity. The conventional metallizing method comprises steps of forming the antireflection film on the surface of an optical material block; cutting it into pieces each having a size of a single optical element; masking a light transmitting portion of the optical element 5 by the metal mask 7 so that the metallized film is formed only on unmasked portions, as shown in FIG. 1, optical element 5 and a metal mask 7 being fixed mutually by a substrate holder 6 and a jig 8; and performing the dry process such as the vacuum deposition or the sputtering to manufacture the metallized film.

In the above-mentioned operation, since the optical elements must be cleaned and set in the jig one by one, much more manhour is required therefor and, thus, it is therefore difficult to metallize a great number of the optical elements.

In order to improve the mass productivity, after forming the antireflection film (not shown) on the optical material block 1 having such a size that several tens of the optical elements 5 can be separated, the metallized film 3 is formed, as shown in FIG. 2, and thereafter, the optical material block is cut along the lines depicted by the dotted lines in the figure. Only one optical element after divided is illustrated in the figure. However, there have been manufactured many products without a sufficient adhesive strength in which the adhered portions are often detached after cutting or after soldering. This results in a low yield and it is therefore impossible to achieve the improvement of the mass productivity.

Therefore, it is an object of this invention to provide a highly reliable optical isolator which is capable of carrying out mass metallization and highly reliable soldering and which is adapted in mass production.

DISCLOSURE OF THE INVENTION

According to this invention, an optical material block having such a size that it can be divided into a plurality of optical elements is preliminarily formed with grooves along predetermined cutting lines, thereafter, an antireflection film and a metallized film for metal fusion-bonding between the optical element and a holder are formed, and then, dividing is performed with a cutting width narrower than the width of the above-mentioned grooves. Thus, the metallized optical elements can be mass-produced in a simple process and a high-performance optical isolator excellent in environment resistance can be obtained.

BEST MODE FOR EMBODYING THE INVENTION

Figure 1A:
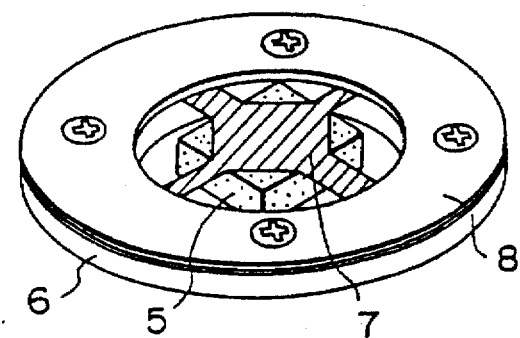
FIGS. 1(a) and (b) are a perspective view and a sectional view for use in describing an outline of a conventional metallizing method.
Figure 1B:
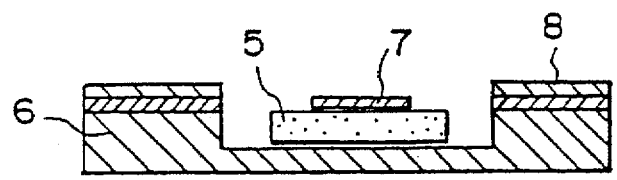
Figure 2:
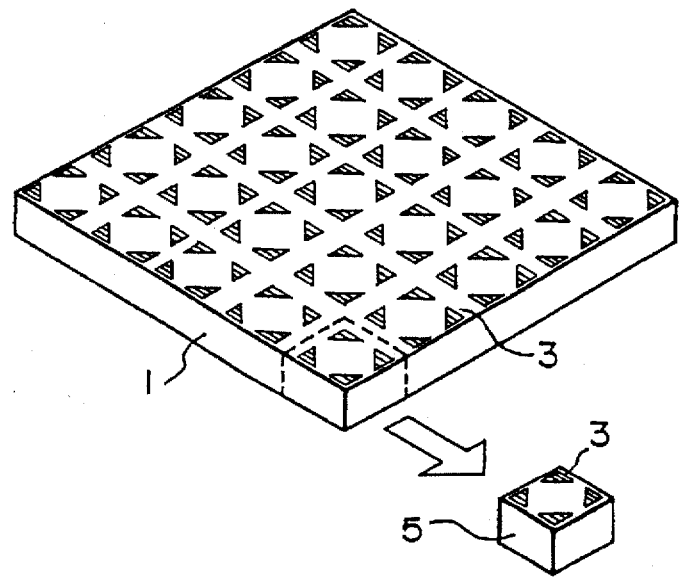
FIG. 2 is a view illustrating an outline of a prior method of manufacturing an optical element.
Figure 3A:
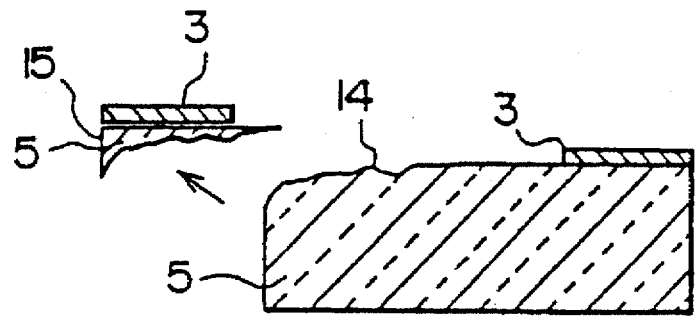
FIGS. 3(a) and (b) are a sectional view and a plan view for use in schematical description of a peeling state after soldering.
Figure 3B:
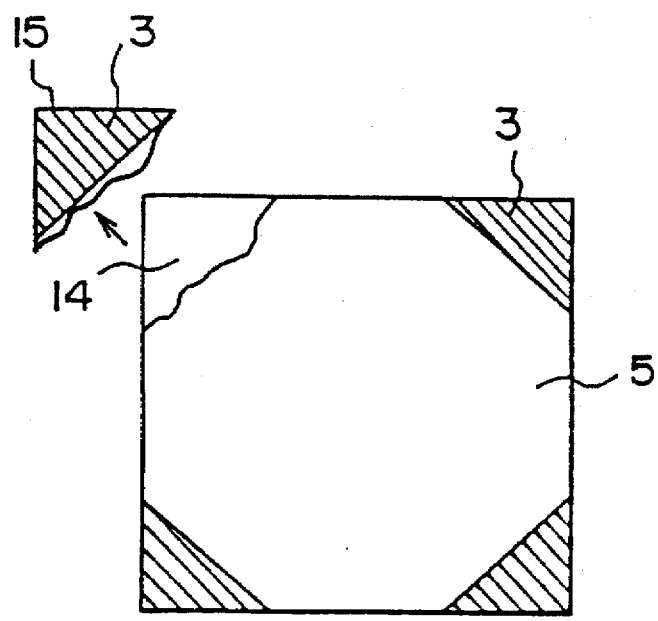

The present inventors formed a metallized film on the surface of a large-sized optical material block in an area corresponding to a plurality of optical elements, separated into pieces each having a size of an individual optical element, soldered to form samples, some of which had the metallized films peeled, and observed the peeled portions in detail in its broken-out section. As a result, it was revealed that, as shown in FIGS. 3(a) and (b), the peeled portion 15 was started not from the metallized film 3 but from the interior of the optical element, depicted by the reference numeral 14, directly under the metallized film. It is therefore believed that the peeling was caused by a strong stress produced in the optical element due to thermal and mechanical impact occurring between a cutting blade and the optical element through the metallized film upon cutting.

Accordingly, in case where the cutting into the optical elements is carried out after forming the metallized film, the cutting portion must be away from the metallized film so that the thermal and the mechanical impact upon cutting do not affect the optical elements.

Figure 4A:
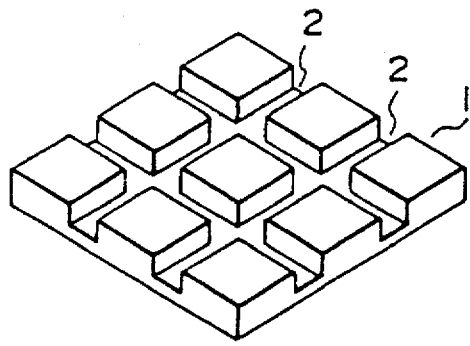
FIGS. 4(a) to (d) are views illustrating outline of processes according to an embodiment of this invention, FIG. 4(a) illustrating a state of an optical material block in which line grooves are formed, FIG. 4(b) illustrating another state with metallized films formed, FIG. 4(c) illustrating a cutting condition, and FIG. 4(d) showing sectional views of optical elements after cutting.
Figure 4B:
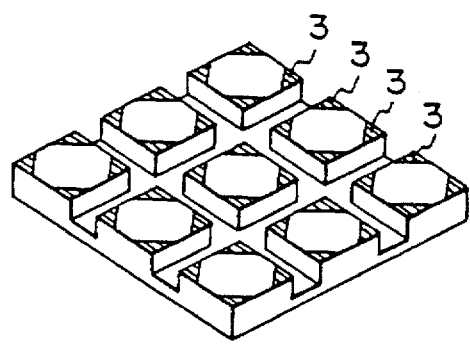

According to the above-mentioned conclusion, line grooves 2 are preliminarily formed or scribed in the optical material block 1 along the cutting line, as shown in FIG. 4(a) and, thereafter, as shown in FIG. 4(b), an antireflection film (not shown) and the metallized film 3 are formed.

Figure 4C:
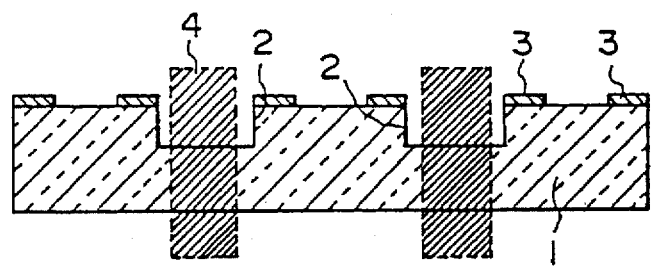
Figure 4D:
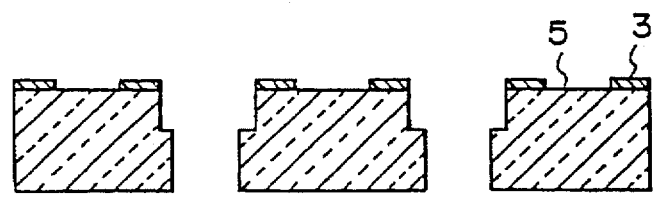

Next, as shown in FIG. 4(c), cutting operation is carried out by the use of a blade having a cutting width 4 narrower than the width of the above-mentioned line grooves 2 so that the blade and the metallized film are not brought into contact (as shown by the hatched portion surrounded by the two dotted lines). As a result, the individual optical elements are obtained as shown in FIG. 4(d).

With the above-mentioned process, it is possible to minimize the stress produced in the optical element directly under the metallized film. Thus, the optical element is prevented from being subjected to peeling after soldering.

Description will now be made as regards an embodiment of this invention in comparison with the prior art as a comparative example.

(Embodiment)

As schematically shown in FIG. 4(a), eight line grooves 2 each having a width of 330 μm and a depth of 350 μm were scribed in a rutile single crystal (optical material block) 1 having a dimension of 11.0×11.0×1.0 (mm) in a four-by-four lattice fashion at the pitch of 1.82 mm, so that the scribing process was carried out in order to obtain twenty-five optical elements. Next, the antireflection film and the metallized film 3 were formed as shown in FIG. 4(b). However, FIG. 4(a) and FIG. 4(b) show only nine optical elements. Thereafter, as shown in FIG. 4(c), the cutting operation was performed along the center of each groove with a blade having a cutting width 4 of 200 μm, and thus twenty-five optical elements 5 of a 1.6 mm square with the metallized films formed thereon were obtained as shown in FIG. 4(d).

(Comparative Example)

In the manner similar to the foregoing embodiment except that the lattice-like grooves are not formed, the antireflection film and the metallized film were formed and the cutting operation was carried out with a blade having a cutting width of 200 μm to manufacture twenty-five optical elements of a 1.6 mm square.

Figure 5:
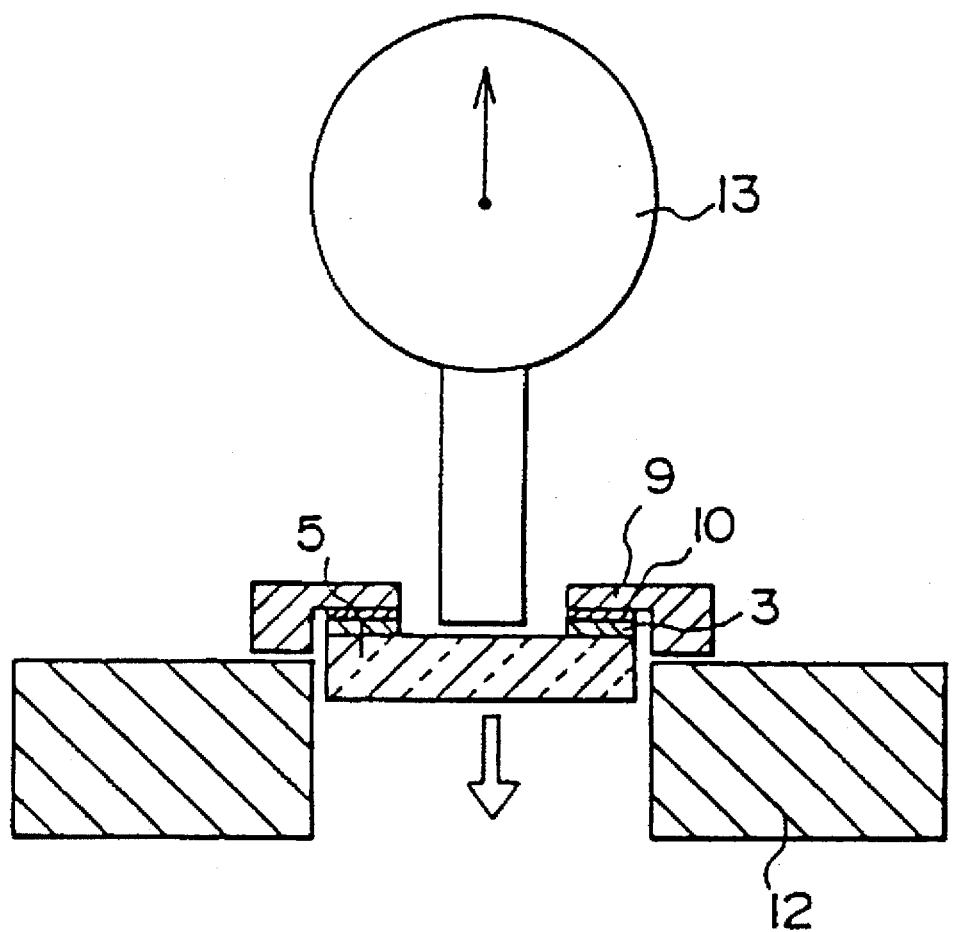
FIG. 5 is a view illustrating an outline of a method of testing an adhesive strength of soldering.

Each of the optical elements with the metallized films in the embodiment and in the comparative example was bonded by soldering to a gold-plated stainless holder, to which an adhesion test was carried out to measure an adhesive strength between the optical element and the holder, and the result shown in Table 1 was obtained. As shown in FIG. 5, the adhesion test was carried out by fixing the holder 9 on a support table 12, loading to the optical element 5, and reading the load upon peeling by a push-pull gauge 13 as the adhesive strength.

TABLE 1

| Result of Adhesion Test | | | |
|---|---|---|---|
| Adhesive Strength | Judgement | Embodiment (Number of Pieces) | Comparative Example (Number of pieces) |
| 200 g or less | no good | 0 | 12 |
| 500 g or less | | 0 | 8 |
| 1 kg or less | | 0 | 2 |
| 2 kg or less | good | 3 | 3 |
| 2 kg or more | | 22 | 0 |
| Total (Number of pieces) | | 25 | 25 |

As is obvious from Table 1, it is understood that the embodiment of this invention provides the good products all of which have a large adhesive strength not smaller than 1 kg.

In the embodiment, the different blades were prepared for the scribing process and the cutting process. However, the above-mentioned scribing and cutting processes can be carried out by the use of the same blade. That is, during the scribing process, the blade is made to pass a plurality of times for one groove with the pitch shifted each time. In the cutting process, the blade is made to pass only once.

In the embodiment of this invention, the line grooves 2 have a rectangular section, as shown in FIG. 4(c). However, the section may be a polygon such as a triangle and a trapezoid, a semicircle, or an ellipse as far as directly receiving no thermal and mechanical impact caused by the blade and the optical material block during the cutting process.

Moreover, in case where the metallized film is formed on the both surfaces of the optical material block, the line grooves are preliminarily formed in the both surfaces. Thus, this invention is not limited to the foregoing embodiment.

As described above, according to this invention, the line grooves are preliminarily formed on the optical elements, whereby it is possible to carry out mass metallization, to carry out soldering with a high reliability, and therefore to mass-produce the optical isolators having a high reliability.

Industrial Applicability

As described above, in the method of manufacturing the optical isolator according to this invention, it is possible to mass-produce optical isolators which is for use in an optical communication, an optical measurement, or the like and which utilizes the Faraday effect. The isolator has a high reliability and is particularly excellent in environment resistance. Thus, it is applicable to various kinds of optical isolators.

I claim:

1. A method of manufacturing an optical isolator, comprising the steps of preparing an optical material block having such a size that a plurality of optical elements can be cut out therefrom, preliminarily forming line grooves in the surface of said block along predetermined cutting lines, thereafter forming an antireflection film and a metallized film for metal fusion bonding with a holder, and cutting with a cutting width narrower than the width of said grooves.

\* \* \* \* \*